United States Patent
Huang et al.

(10) Patent No.: US 7,145,876 B2
(45) Date of Patent: Dec. 5, 2006

(54) METHOD AND APPARATUS INCORPORATING ADAPTIVE DATALINK FRAMING FOR MESSAGE COMMUNICATION

(75) Inventors: Jian Huang, Coral Springs, FL (US); Robert J. O'Dea, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 1029 days.

(21) Appl. No.: 10/160,622

(22) Filed: May 31, 2002

(65) Prior Publication Data

US 2003/0223390 A1    Dec. 4, 2003

(51) Int. Cl.
*H04L 12/26* (2006.01)

(52) U.S. Cl. .................. 370/232; 370/230; 370/230.1; 370/252; 370/465

(58) Field of Classification Search ................ 370/332, 370/333, 469, 470, 229, 230, 230.1, 232, 370/252, 465
See application file for complete search history.

(56) References Cited

U.S. PATENT DOCUMENTS

| | | | |
|---|---|---|---|
| 4,841,526 A * | 6/1989 | Wilson et al. ............ 714/748 |
| 5,307,351 A * | 4/1994 | Webster .................... 370/470 |
| 6,236,643 B1 | 5/2001 | Kerstein |
| 6,236,647 B1 * | 5/2001 | Amalfitano ................ 370/335 |
| 6,765,870 B1 * | 7/2004 | Chintada et al. ........... 370/230 |
| 7,096,274 B1 * | 8/2006 | Ci et al. .................... 709/236 |
| 2004/0015765 A1 * | 1/2004 | Cooper et al. ............. 714/750 |
| 2004/0180696 A1 * | 9/2004 | Foore et al. ............... 455/561 |

OTHER PUBLICATIONS

"Adaptive Frame Length Control for Improving Wireless Link, Throughput, Range, and Energy Efficiency", Paul Letteri and Mani B. Srivastava, 1998 IEEE, pp. 564-571.

* cited by examiner

*Primary Examiner*—Ricky Q. Ngo
*Assistant Examiner*—Nguyen Ngo

(57) ABSTRACT

A communication device (300) operates in a training mode to develop parameters based on estimates related to at least two different instances of channel conditions, such as indicated by bit error rates for channel transmissions (610, 620, 710, 720). The parameters are used to define a function that characterizes an optimized throughput or energy consumption per bit through varying channel conditions. The function is preferably of the form $a0+a1*\log(1+L_p)$, where $a0$ and $a1$ are fitted parameters, and $L_p$ the frame size. The device responds to changes in channel conditions by transmitting messages on the communication channel using a frame size adapted for channel conditions based on the particular function and the developed parameters (640–680, 740–780).

12 Claims, 5 Drawing Sheets

METHOD AND APPARATUS INCORPORATING ADAPTIVE DATALINK FRAMING FOR MESSAGE COMMUNICATION

FIELD OF THE INVENTION

The present invention relates generally to communication systems and more particularly to data framing for message communication.

BACKGROUND OF THE INVENTION

Digital communications conducted over wireless communication channels are generally subjected to environmental factors that can adversely impact throughput, required energy, or effective range. Bit error rate is often used to characterize channel conditions. Under poor channel conditions, there is usually a high bit error rate for data communications, while under good channel conditions, the bit error rate for such communications is lower. Consequently, there are many techniques that utilize bit error rate determinations for monitoring throughput and related channel parameters when operating communication systems.

The Open Systems Interconnection (OSI) reference model defines various layers of abstraction for structuring communications. These layers include, among others, the Media Access Control (MAC) layer. In a typical protocol for implementing the MAC layer, data is segmented into packets and the packets transmitted in frames having a particular length. The performance of a MAC layer protocol under given channel conditions can be characterized by transmission delay, defined as the average time spent by a packet while awaiting transmission, and throughput, defined as the fraction of the channel capacity used for data transmissions. Recently, there has been some attention given to the development of techniques to adapt frame length to reflect channel conditions, in an effort to improve performance at the MAC layer. One approach is discussed in a paper entitled ADAPTIVE FRAME LENGTH CONTROL FOR IMPROVING WIRELSS LINK THROUGHPUT, RANGE, AND ENERGY EFFICIENCY, published by Lettieri et al., in the 1998 Institute of Electrical and Electronics Engineers (IEEE) proceedings. Here, the author concluded that performance in wireless networks could improve by manipulating the frame size used to transmit data packets at the MAC layer. In this approach, an approximation of bit error rate on a communication channel is obtained by examining packet error rate, and this approximation is used to select one of "three or four distinct levels of fragmentation over orders of magnitude of bit error rate." However, this reference uses an empirical approach to determine preferred frame size that is not adequately for many applications.

While it is recognized that adaptive frame sizing could lead to improvements in network performance, particularly for problems related to congestion due to heavy traffic or densely-deployed network, there exists a need for a practical approach for realizing these benefits.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENTS

Generally, the present invention provides for adaptive datalink frame sizing according to channel conditions in order to optimize data throughput and/or energy consumption. A communication device, according to the invention, operates in a training mode to develop parameters based on estimates related to at least two different instances of channel conditions, such as indicated by bit error rates for channel transmissions. The parameters are used to define a function that characterizes the optimize throughput or energy consumption per bit through varying channel conditions. The function is preferably of the form $a0+a1*\text{Log}(1+Lp)$, where $a0$ and $a1$ are the fitted parameters, and $Lp$ the frame size. In regular operation, the device responds to changes in channel conditions by transmitting messages on the communication channel using a frame size adapted for channel conditions based on the particular function and the developed parameters.

Figure 1:
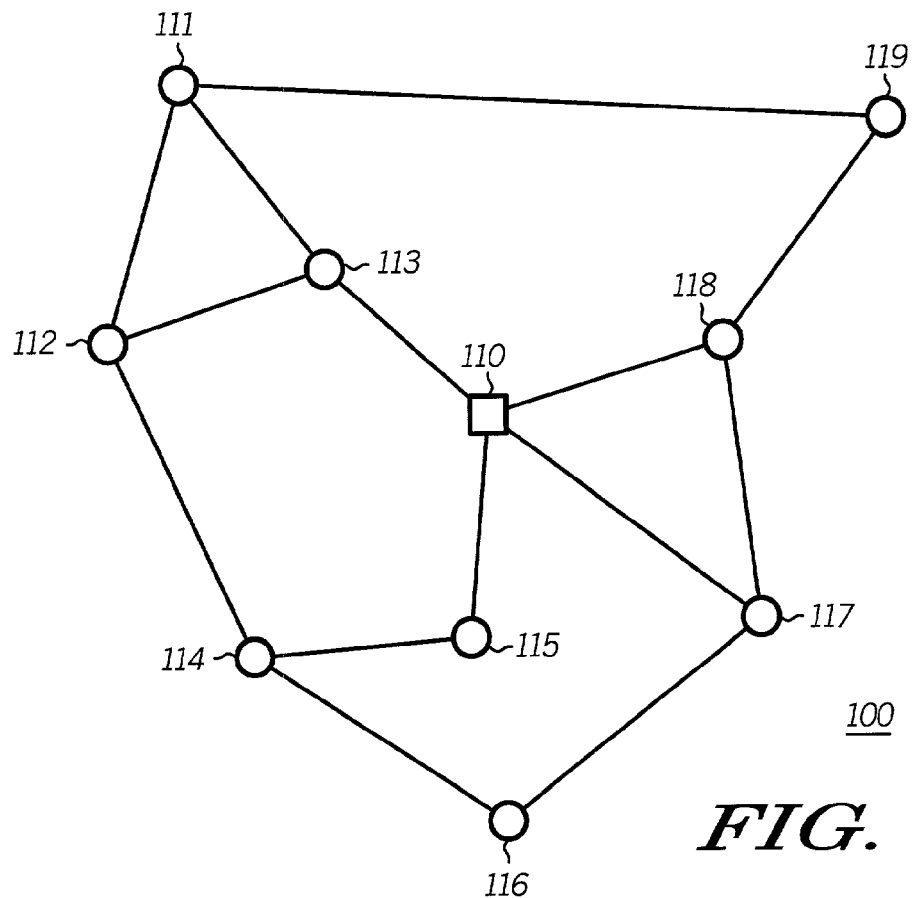
FIG. 1 is a diagram of a wireless communications network, in accordance with the present invention.

FIG. 1 shows a portion of a representative communication network 100, in accordance with the present invention. The communication network 100 of the preferred embodiment is an ad-hoc network having nodes 110–119 distributed over a geographically dispersed area. The nodes preferably implement a sensor network or other data collection network but are not limited to such function. As shown, the nodes of the network have self-organized, and exhibit network redundancy in their communication links. The nodes communicate with one another through single hop or multi-hop communication links using a protocol stack that includes support for at least a portion of the Open Systems Interconnection (OSI) reference model; namely, the media access control (MAC) layer and the physical (PHY) layer. Each node 110–119 has memory, computing, and radio frequency (RF) processing capabilities to establish and operate the communication links in a network efficient and energy efficient manner. Accordingly, each node supports the adaptive frame length methodology of the present invention.

Figure 2:
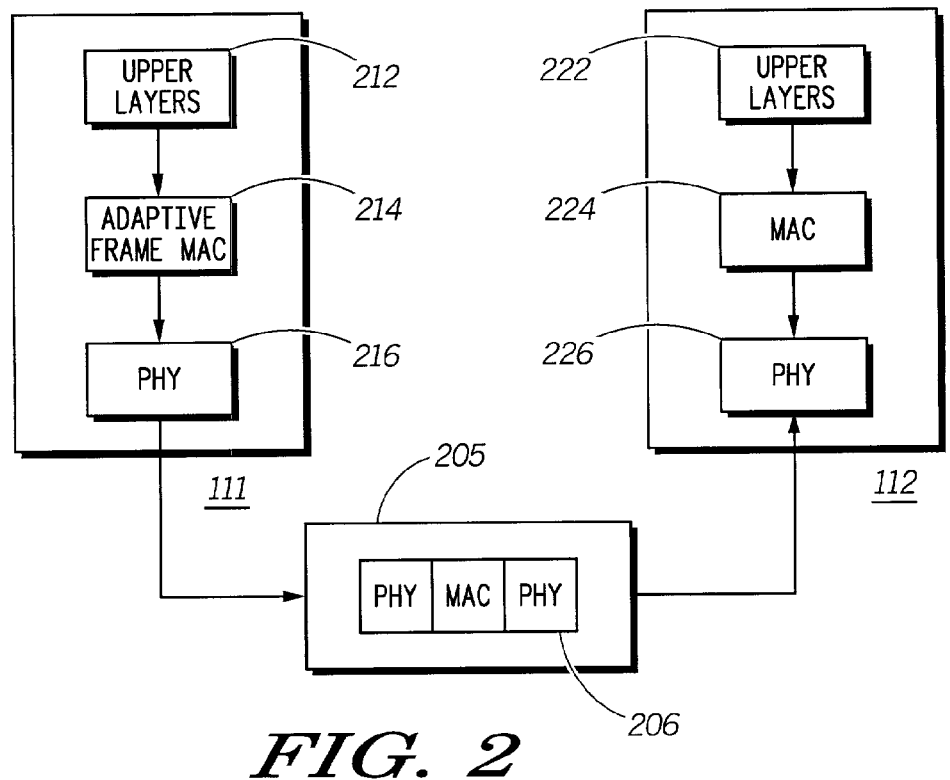
FIG. 2 is a block diagram showing communications between two devices, in accordance with the present invention.

FIG. 2 shows an example of block communications between two of the devices 111, 112. Messages are processed using upper layers 212 of the protocol stack, segmented for transmission using the adaptive frame length MAC layer, and transmitted as a data packet 206 on a communication channel 205 using the PHY layer 216. Similarly messages are retrieved from the communication channel via the PHY layer 226, de-fragmented at the MAC layer 224 and sent to upper layers 222 for further processing.

Figure 3:
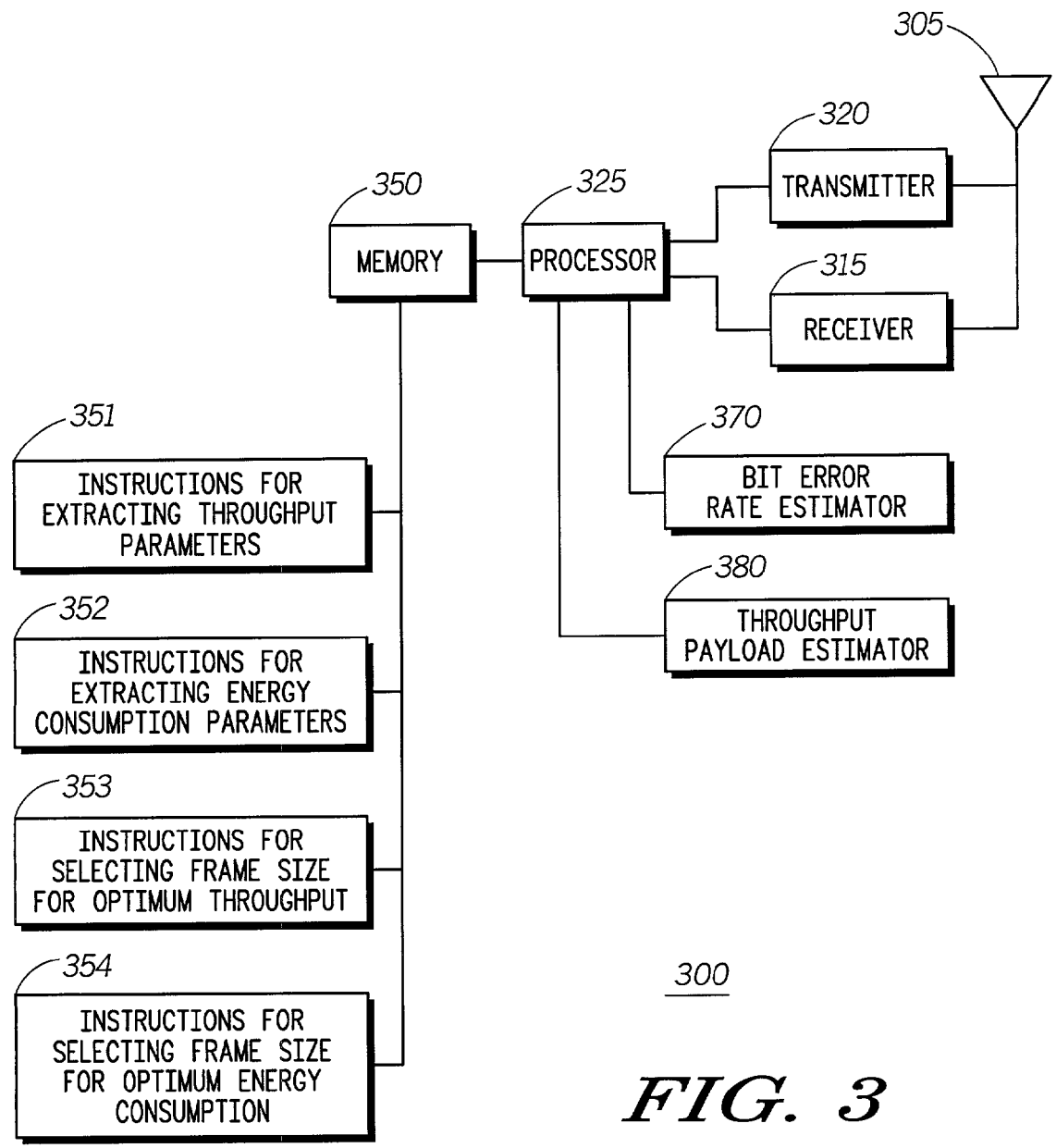
FIG. 3 is a block diagram of a communication device operable on the wireless communications network, and operable to adapt data frame size based on channel conditions, to optimize throughput and/or energy consumption per bit on a communication channel, in accordance with the present invention.

FIG. 3 shows a block diagram of a communication device 300 operable as a node in the network of FIG. 1. In the device, a processor 325 governs the overall device function such as data receipt, transmission, and processing. A receiver 315 coupled to the processor 325 receives incoming messages from a communication channel via an antenna 305 and provides these messages to the processor 325. A transmitter 320, coupled to the processor 325, provides the capability of transmitting on the communication channel data pertaining to device function or other communication requirements as needed. A bit error rate (BER) estimator 370 provides an estimate of the average rate of bit-error for digital communication on the communication channel. In one embodiment, the BER estimator 370 compares equal length frames of two separate bit streams received over a particular time interval and compares raw data with uncorrected data. The BER estimator 370 calculates the number of bit errors by counting the number of bits that differ between the received channel bits and the error corrected estimate of the transmitted channel bits. Error estimates can also be derived from test sequences, from measuring signal parameters, and from techniques using violation detection. The device also includes a throughput payload estimator 380 for estimating the actual throughput for transmissions on the communication channel. Actual throughput can be estimated from current traffic based on the Aloha or other types of random access channel model as is known in the art. The BER and throughput payload estimators 370, 380 can be implemented as part of the decoder design.

A memory module 350 stores operating instructions and data for the device. Specifically, the memory 350 includes operating instructions 351, 352 for extracting throughput and energy consumption parameters pertaining to the communication, and instructions 353, 354 for selecting frame size for optimum throughput and/or energy consumption for message transmission. The procedures and steps implemented by the various operating instructions 351, 352, 353, 354 of the node in order to optimize packet size/frame length are described below.

Figure 4:
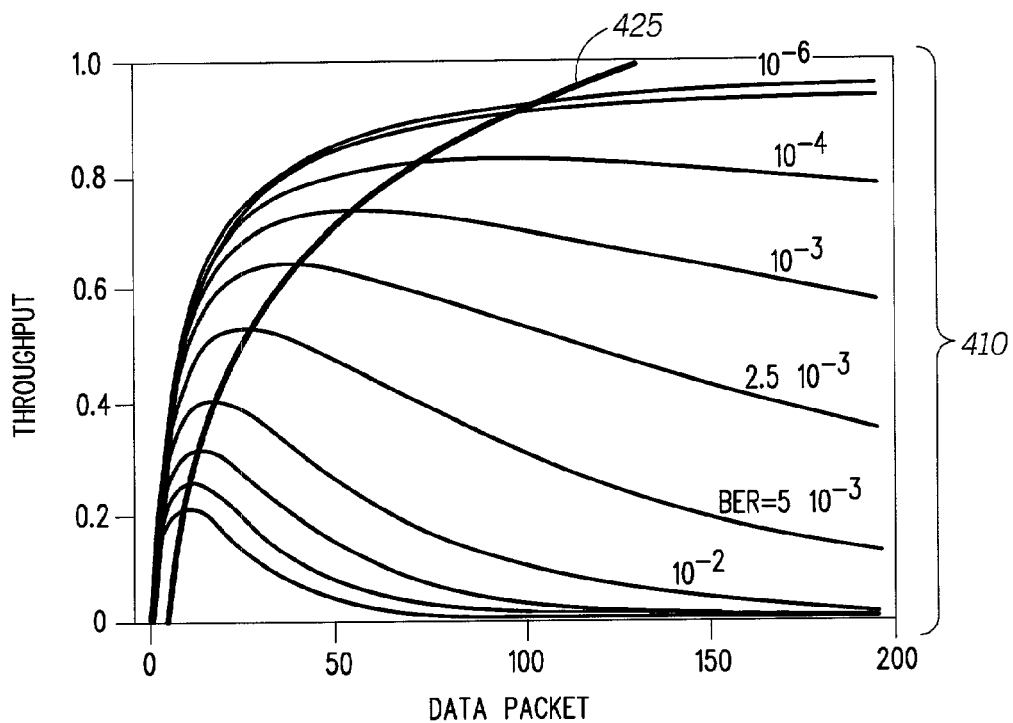
FIG. 4 is a graph showing plots of throughput versus payload packet size for a variety of bit error rates for communications under varying channel conditions, in accordance with the present invention.

The present invention exploits a relationship existing between throughput and datalink frame size for given bit error rate. In conjunction with the OSI model, the general form of data throughput $T_p$ normalized to the raw bit rate of the channel for data link layer can be expressed as a function of bit error rate:

$$T_p = \frac{L_p}{L_p + L_{mac} + L_{phy}} (1 - BER)^{(L_p + L_{mac})}, \quad [1]$$

where $L_p$ is the length of the data link payload in bytes, $L_{mac}$ the length of the MAC header, $L_{phy}$ the total overhead of the PHY layer including any preamble, post-amble, and inter-frame spacing specified by the attendant protocol. For example, for the commonly used IEEE 802.11 protocol specification, the values for $L_{mac}$ and $L_{phy}$ are 52.5 bytes and 40 bytes respectively. FIG. 4 shows a graph 400 of plots of throughput $T_p$ versus payload packet size $L_p$ for a variety of bit error rates for a given communication channel, in accordance with the present invention. Plots 410 are shown for various bit error rates including bit error rates ranging from $10^{-2}$ through $10^{-6}$. According to the present invention, the graph includes a plot 425 of a non-linear function that is used to approximate the maximum throughput $T_{max}$ for the various bit error rates that span the operating boundary conditions of the communication channel. Preferably, the function has the form:

$$T_{max} = a0 + a1 \bullet \text{Log}(1 + L_p) \quad [2]$$

where a0 and a1 are parameters derived using the throughput Tp at boundary conditions corresponding to the maximum and minimum expected bit error rate when operating on the channel. Ordinarily, the maximum bit error rate occurs when the channel conditions are at their worst, and the minimum bit error rate corresponds to the best channel conditions.

Figure 5:
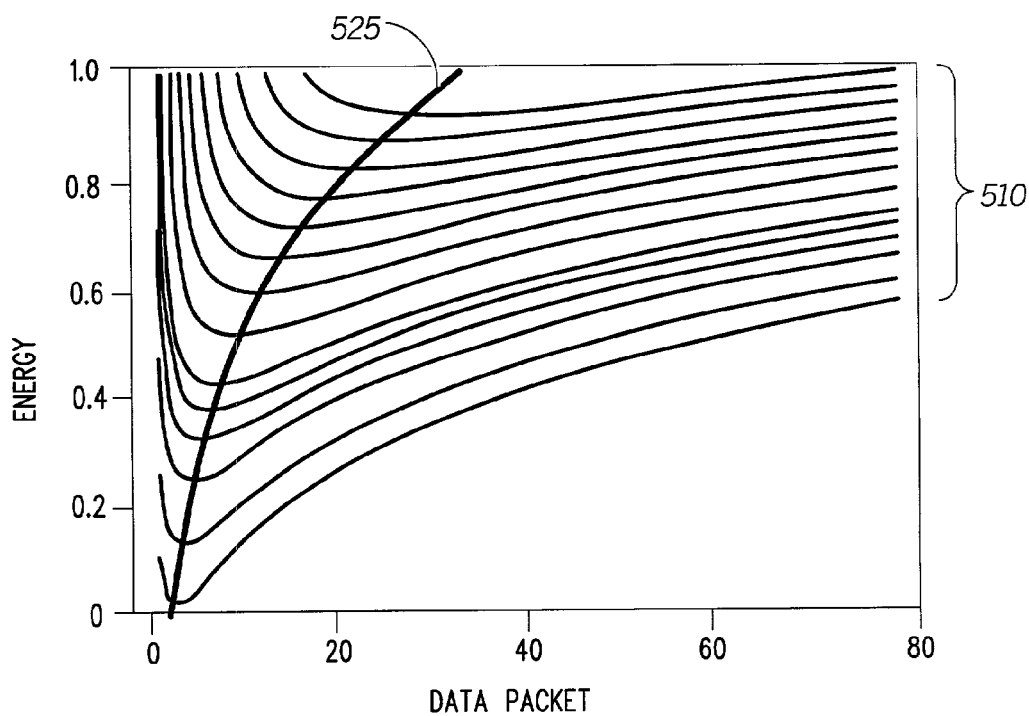
FIG. 5 is a graph showing plots of normalized energy per bit versus payload packet size for various normalized throughput values, in accordance with the present invention.

The present invention also contemplates the selection of data link frame size to optimize energy consumption, i.e., minimizing the energy per bit used to successfully convey a message through the communication channel. The energy per bit $E_b$ can be expressed for various modulation techniques using well-known relationships. For example, with respect to Quadrature Phase Shift Keying (QPSK), the relationship between bit error rate (BER) and $E_b$ can be expressed as:

$$BER = \frac{1}{4} \text{erfc}\left(\sqrt{\frac{E_b}{N_0}}\right), \quad [3]$$

where erfc is the Error function, and $N_0$ the spectral noise density. By combining this BER equation with the throughput Tp equation previously discussed, a family of curves can be plotted that represent the normalized transmission energy per bit versus the length of the data link payload in bytes for a variety of values of data throughput. FIG. 5 is a graph showing plots 510 of the normalized energy per bit versus payload packet size $L_p$ for various normalized throughput values. According to the present invention, the graph includes a plot 525 of a non-linear function that is used to approximate the minimum energy per bit $E_{min}$ for various throughput values that span the operating boundary conditions of the communication channel. Preferably, the function has the form:

$$E_{min} = b0 + b1 \bullet \text{Log}(1 + L_p) \quad [4]$$

where b0 and b1 are parameters derived using the normalized energy per bit at boundary conditions corresponding to the maximum and minimum expected bit error rate when operating on the channel.

Significantly, functions have been shown that provide for the optimum throughput in high BER conditions, and that provide for minimal energy consumption in low throughput conditions. These functions have a common form of expression with a single adjustable variable/adaptive data link frame length.

Figure 6:
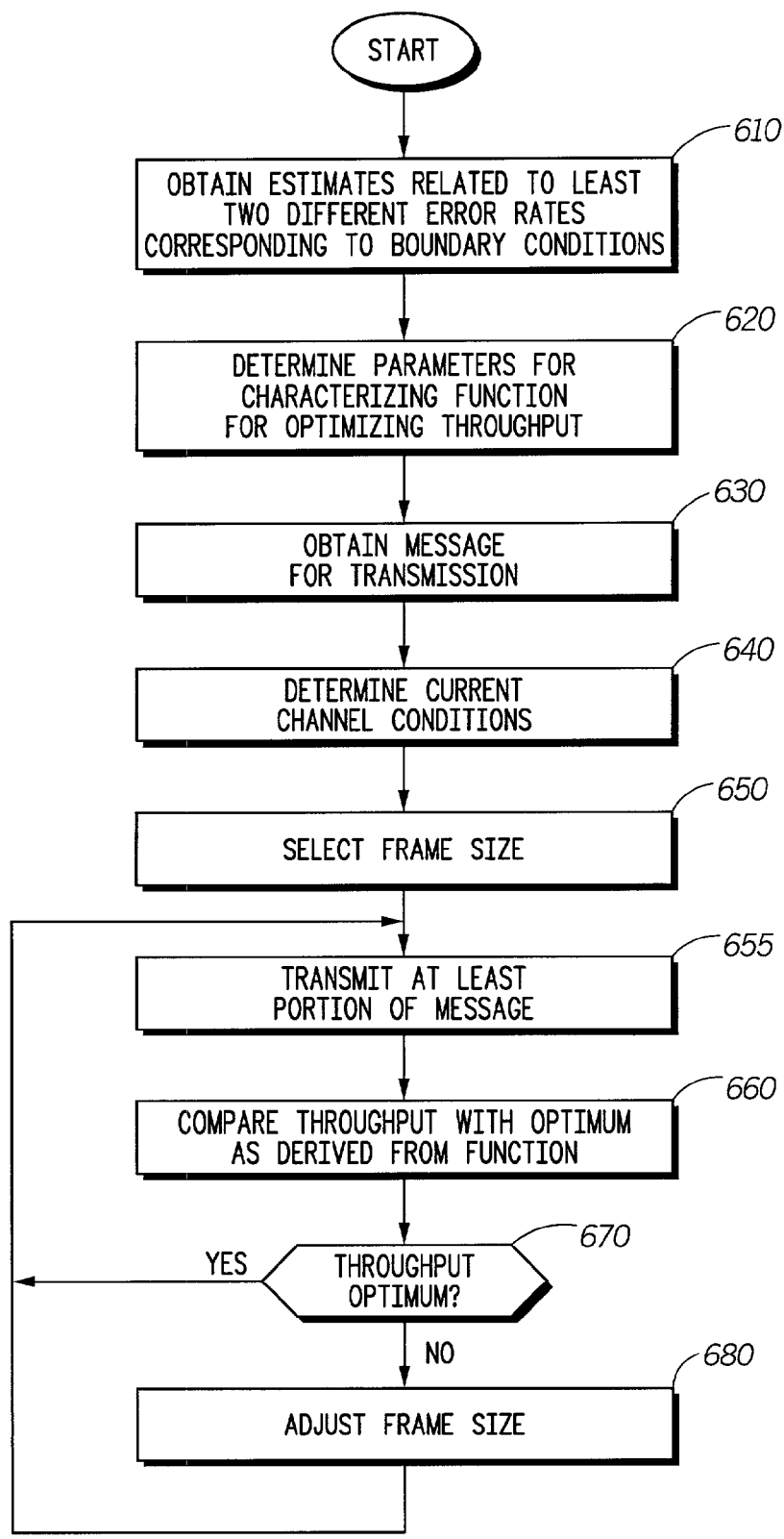
FIG. 6 is a flowchart of procedures for transmitting a message on a communication channel while using adaptive frame length to optimize throughput, in accordance with the present invention.

FIG. 6 shows a flowchart of procedures 600 for transmitting a message on a communication channel while using an adaptive frame length to optimize throughput, in accordance with the present invention. A communication device determines boundary conditions for the communication channel by obtaining estimates related to at least two different bit error rates for transmissions on the communication channel, step 610. As indicated earlier, the optimum throughput $T_{max}$ for a given channel environment is related to the data link length $L_p$ according to the function [2] described above. Accordingly, after two rounds of BER estimations, both parameters a0 and a1 are determined, step 620. In order to better characterize the channel, the BER estimates are preferably obtained at the boundary conditions for the communication channel, i.e., conditions corresponding to the maximum bit error rate and minimum bit error rate. In this manner, the parameters a0 and a1 will lead to a function more representative of the range of likely or expected channel conditions. With knowledge of the BER estimates, the data frame length $L_p$ and frame head parameters such as $L_{mac}$ and $L_{phy}$, two different throughputs $T_p$ can be calculated using equation [1], and two instances of equation [2] can be solved simultaneously to obtain the unknown parameters. Preferably, the communication device determines a first throughput, T1, under maximum bit error rate conditions, and a second throughput, T2, under minimum bit error rate conditions. The unknown parameters a0 and a1 can then be determined by solving the equations:

$$T1=a0+a1*Log(1+L_p);$$

$$T2=a0+a1*Log(1+L_p).$$

The parameters so obtained provide for a function that approximates maximum throughput for a variety of bit error rates that span the boundary conditions of the communication channel.

The communication obtains a message for transmission, step 630, and upon so doing, determines current channel conditions as characterized by a bit error rate estimate for the channel conditions, step 640. The bit error rate estimate is used to determine current throughput $T_c$ for the channel, and equation [2] used to determine the appropriate frame size. In one embodiment, the frame size is determined through an iterative process. A frame size is chosen and a portion of the message transmitted using the selected frame size, steps 650, 655. The actual throughput for the portion of the message is obtained, step 660, and compared with the optimum throughput for that frame size as determined by equation [2] using parameters a0, a1, step 670. When the actual throughput is inconsistent with the optimum throughput, the frame size is adjusted and the process repeated until the optimum throughput is obtained, step 680.

Figure 7:
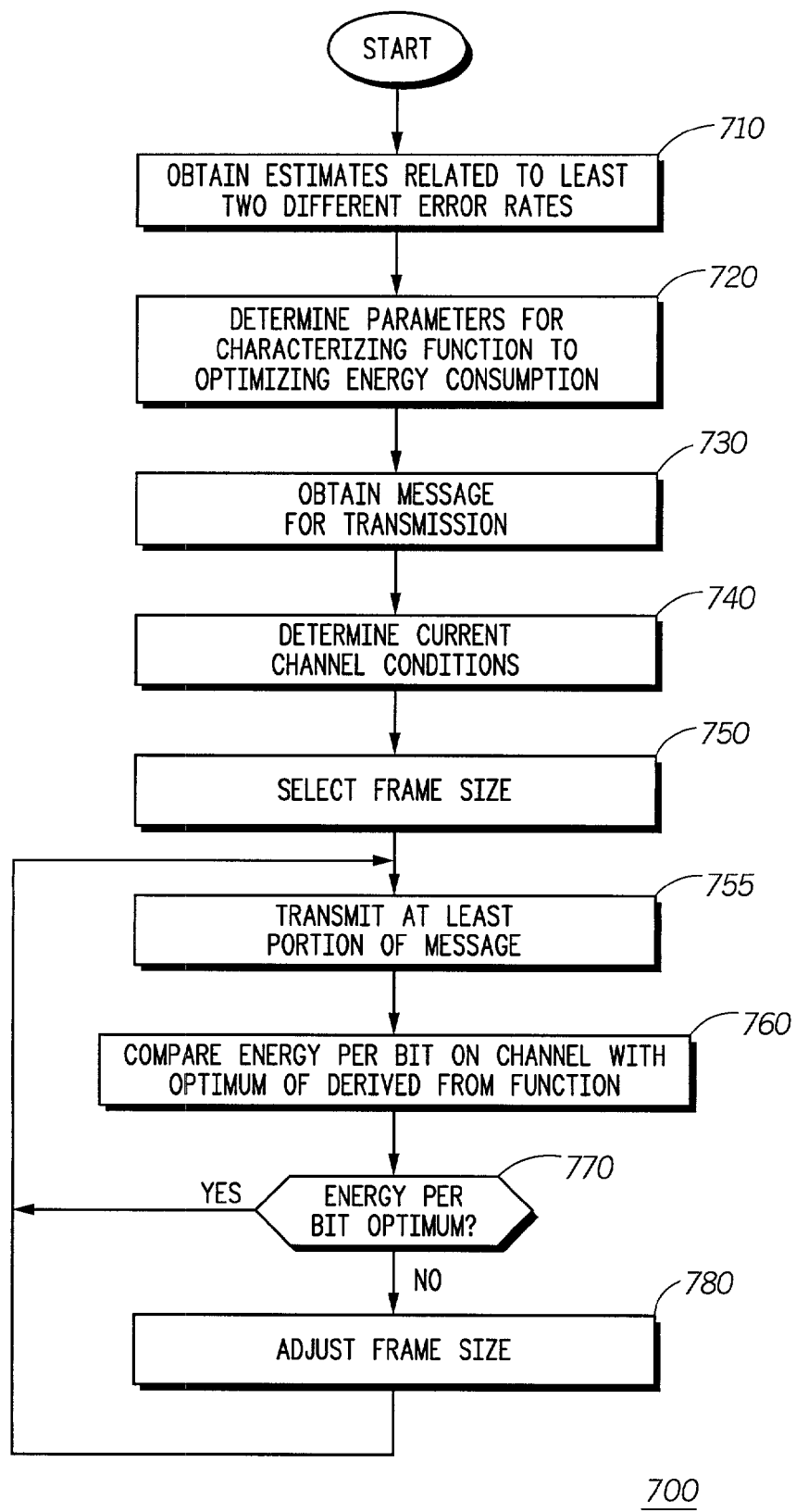
FIG. 7 is a flowchart of procedures for transmitting a message on a communication channel while using adaptive frame length to optimize energy consumption per bit, in accordance with the present invention.

FIG. 7 is a flowchart of procedures used by a communication device for transmitting a message on a communication channel while using an adaptive frame length to optimize energy consumption per bit, in accordance with the present invention. The communication device characterizes the communication channel by obtaining estimates related to at least two different bit error rates for transmissions on the communication channel, step 710. The two different bit error rates preferably correspond to the boundary conditions for the communication channel, i.e., corresponding to the maximum and minimum error rates. As indicated earlier, the optimized energy consumption per bit $E_{min}$ for a given channel environment is related to the data link length $L_p$ according to the function [4] described above. Accordingly, after two rounds of BER estimations, both parameters b0 and b1 are determined, step 720. With knowledge of the BER estimates, two different values for the energy per bit can be calculated using equation [3], and two instances of equation [2] can be solved simultaneously to obtain the unknown parameters. Preferably, the communication device determines a first energy per bit value, E1, under maximum bit error rate conditions, and a second energy per bit value, E2, under minimum bit error rate conditions. The unknown parameters b0 and b1 can then be determined by solving the equations:

$$E1=b0+b1*Log(1+L_p),$$

$$E2=b0+b1*Log(1+L_p),$$

The parameters so obtained provide for a function that approximates minimum transmission energy per bit for a variety of throughputs that span the boundary conditions of the communication channel.

The communication obtains a message for transmission, step 730, and upon so doing, determines current channel conditions as characterized by a throughput estimate for the channel conditions, step 740. The throughput estimate, which is related to the bit error rate, is used to determine energy per bit for transmissions on channel, and equation [4] used to determine the appropriate frame size. In one embodiment, the frame size is determined through an iterative process. A frame size is chosen and a portion of the message transmitted using the selected frame size, steps 750, 755. The actual energy per bit for the transmitted portion of the message is obtained, step 760, and compared with the optimum energy per bit for that frame size as determined by equation [4] using parameters b0, b1, step 770. When the actual energy per bit is inconsistent with the optimum energy per bit, the frame size is adjusted and the process repeated until the optimum energy per bit is obtained, step 780.

The present invention provides for significant benefits over the prior art. By developing a function that characterizes a communication channel, a device can use information on bit error rate estimates to increase throughput or reduce energy consumption in response to channel conditions. This approach is particularly useful for handling channel problems caused by low level or bursty interference, by fading, or by congestion due to densely-deployed nodes. Since bit error rate estimation/detection is generally available in digital communication systems for error correction purposes, these underlying components can form the basis for implementing the adaptive data link framing techniques described herein.

While the above description is of the preferred embodiment of the present invention, it should be appreciated that the invention may be modified, altered, or varied without deviating from the scope and fair meaning of the following claims.

What is claimed is:

1. A method for transmitting a message on a communication channel, comprising the steps of:
    determining boundary conditions for transmissions on the communication channel by obtaining a first estimate related to maximum bit error rate and a second estimate related to minimum bit error rate;
    determining first and second parameters using the first and second estimates and a function having a form, $T=a0+a1*Log(1+L_p)$, where T represents the first or second estimate, a0 represents the first parameter, a1 represents the second parameter, and Lp is representative of frame size used for transmissions while determining the boundary conditions;
    obtaining the message for transmission of the communication channel;
    transmitting the message on the communication channel using a frame size adapted for channel conditions, comprising the steps of:

obtaining a third estimate relating to expected bit error rate on the communication channel during transmission of the message;

selecting the frame size, L, for channel transmission of the message according to a function of the form X=a0+a1*Log(1+L), where X is derived from the third estimate.

2. The method of claim 1, wherein the step of determining boundary conditions comprises the steps of:

determining a first throughput, T1, under maximum bit error rate conditions;

determining a second throughput, T2, under minimum bit error rate conditions; and wherein the step of determining first and second parameters comprises the step of solving for a0 and a1 using equations:

$T1=a0+a1*Log(1+Lp);$ $T2=a0+a1*Log(1+Lp).$

3. The method of claim 2, wherein the step of selecting the frame size comprises the steps of:

determining a throughput value, T, corresponding to a current bit error rate for the communication channel;

determining L according to the function T=a0+a1*Log(I+L).

4. The method of claim 2, wherein the step of transmitting the message comprises the steps of:

a) choosing a frame size, L;
b) transmitting a portion of the message using the frame size, L;
c) comparing actual throughput for the portion of the message with a desired throughput, Tc, determined according to a function of the form, Tc=a0+a1*Log(1+L);
d) when the actual throughput is inconsistent with the desired throughput, adjusting the frame size, L, and repeating steps (b)–(d).

5. The method of claim 1, wherein the step of determining boundary conditions comprises the steps of:

determining energy consumption, E1, for a particular throughput under maximum bit error rate conditions;

determining energy consumption, E2, for the particular throughput under minimum bit error rate conditions; and wherein the step of determining first and second parameters comprises the step of solving for a0 and a1 using equations:

$E1=a0+a1*Log(1+L),$ $E2=a0+a1*Log(1+L).$

6. The method of claim 1, wherein the step of transmitting the message comprises the steps of:

a) choosing a frame size, L;
b) transmitting a portion of the message using the frame size, L;
c) comparing actual energy consumption for the portion of the message with a desired energy consumption, Ec, determined according to a function of the form, E=a0+a1*Log(1+L);
d) when the actual energy consumption is inconsistent with the desired energy consumption, adjusting the frame size, L, and repeating steps (b)–(d).

7. A method for transmitting a message on a communication channel, comprising the steps of:

determining at least two bit error rate measurements for the communication channel;

using the bit error rate measurements to determine parameters for a parametric equation that approximates minimum energy or maximum throughput for a variety of bit error rates;

obtaining the message for transmission on the communication channel; and transmitting the message on the communication channel using a frame size adapted for channel conditions and based on the determined parameters for the parametric equation wherein the step of transmitting the message comprises the steps of:

a) choosing a frame size, L;
b) transmitting a portion of the message using the frame size, L;
c) comparing actual throughput for the portion of the message with a desired throughput, T, determined according to a function of the form, T=a0+a1*Log(1+L);
d) when the actual throughput is inconsistent with the desired throughput, adjusting the frame size, L, and repeating steps (b)–(d).

8. The method of claim 7, wherein the step of determining at least two bit error rate measurements comprises the steps of:

determining energy per bit, E1, for a particular throughput under maximum bit error rate conditions;

determining energy per bit, E2, for the particular throughput under minimum bit error rate conditions; and wherein the step of determining parameters comprises the step of solving for parameters b0 and b1 using equations:

$E1=b0+b1*Log(1+Lb),$ $E2=b0+b1*Log(1+Lb),$ where Lb is representative of frame size used in message transmission.

9. The method of claim 8, wherein the step of transmitting the message comprises the steps of:

a) choosing a frame size, L;
b) transmitting a portion of the message using the frame size, L;
c) comparing actual energy per bit for the portion of the message with a desired energy per bit, Ec, determined according to a function of the form, E=a0−t a1*Log(1+E);
d) when the actual energy per bit is inconsistent with the desired energy per bit, adjusting the frame size, L, and repeating steps (b)–(d).

10. The method of claim 7, wherein the step of determining at least two bit error rate measurements comprises the steps of:

determining a first throughput, T1, under maximum bit error rate conditions;

determining a second throughput, T2, under minimum bit error rate conditions; and wherein the step of determining first and second parameters comprises the step of solving for a0 and a1 using equations:

$T1=a0a1*Log(1+Lb);$ $T2=a0a1*Log(1+Lb),$ where Lb represents frame size used in for transmissions on the channel when determining boundary conditions.

11. The method of claim 10, further comprising the step of
selecting the frame size; wherein the step of selecting the frame size comprises the steps of:
determining a throughput value, T, corresponding to a current bit error rate for the communication channel;
determining L according to the function T=a0+a1*Log(1+L).

12. A communication apparatus, comprising:
means for operating in a training mode including:
means for determining boundary conditions for transmissions on a communication channel by obtaining a first estimate related to maximum bit error rate and a second estimate related to minimum bit error rate; and
means for determining first and second parameters using the first and second estimates and a function having a form, T=a0+a1*Log(1+Lp) where T represents the first or second estimate, a0 represents the first parameter, a1 represents the second parameter, and $L_p$ is representative of frame size used for transmissions while determining the boundary conditions;
means for transmitting a message on the communication channel using a frame size adapted for channel conditions, including:
means for obtaining a third estimate relating to expected bit error rate on the communication channel during transmission of the message;
means for selecting the frame size, L, for channel transmission of the message according to a function of the form X=a0+a1*Log(1+L), where X is derived from the third estimate.

* * * * *